(12) United States Patent
Mouton et al.

(10) Patent No.: US 9,926,944 B2
(45) Date of Patent: Mar. 27, 2018

(54) DEVICE FOR GUIDING VARIABLE PITCH DIFFUSER VANES OF A TURBINE ENGINE

(71) Applicant: SNECMA, Paris (FR)

(72) Inventors: Clementine Charlotte Marie Mouton, Tournan en Brie (FR); Olivier Belmonte, Perthes en Gatinais (FR); Alain Marc Lucien Bromann, Vulaines sur Seine (FR); Jeremy Phorla Lao, Melun (FR)

(73) Assignee: SNECMA, Paris (FR)

( * ) Notice: Subject to any disclaimer, the term of this patent is extended or adjusted under 35 U.S.C. 154(b) by 913 days.

(21) Appl. No.: 14/341,966

(22) Filed: Jul. 28, 2014

(65) Prior Publication Data
US 2016/0363133 A1  Dec. 15, 2016

(30) Foreign Application Priority Data

Jul. 30, 2013  (FR) ...................................... 13 57533

(51) Int. Cl.
*F04D 29/56* (2006.01)
*F01D 17/16* (2006.01)
*F04D 27/00* (2006.01)

(52) U.S. Cl.
CPC ......... *F04D 29/563* (2013.01); *F01D 17/162* (2013.01); *F04D 27/002* (2013.01); *F05D 2220/3216* (2013.01); *Y02T 50/671* (2013.01)

(58) Field of Classification Search
CPC .... F04D 29/563; F04D 27/002; F01D 17/162; F05D 2220/3216; Y02T 50/671
(Continued)

(56) References Cited

U.S. PATENT DOCUMENTS

| RE21,272 E | * | 11/1939 | Hallerberg | ........... F02M 35/026 |
| | | | | 55/322 |
| 2,651,496 A | * | 9/1953 | Buckland | ................ F01D 9/065 |
| | | | | 415/135 |

(Continued)

FOREIGN PATENT DOCUMENTS

| DE | 10 2008 032 661 A1 | 1/2010 |
| EP | 1 319 844 A1 | 6/2003 |

(Continued)

OTHER PUBLICATIONS

French Preliminary Search Report dated Apr. 23, 2014 in French Application 13 57533, filed on Jul. 30, 2013 ( with English Translation of Categories of Cited Documents).

*Primary Examiner* — Kenneth Bomberg
*Assistant Examiner* — Brian Delrue
(74) *Attorney, Agent, or Firm* — Oblon, McClelland, Maier & Neustadt, L.L.P.

(57) ABSTRACT

A device for guiding variable pitch diffuser vanes of a turbine engine is provided. The device includes a first ring having an axial portion at its periphery that is extended by a collar extending radially outwards; a second ring mounted around the axial portion of the first ring so as to cooperate therewith to define a plurality of outwardly open sockets; a plurality of cylindrical bushings, each mounted in a respective socket for the purpose of receiving a guide pivot of a diffuser vane; and a resilient clamping ring for cooperating with one of the rings in order to clamp the two rings axially one against the other.

8 Claims, 5 Drawing Sheets

(58) Field of Classification Search
USPC .......................................................... 415/160
See application file for complete search history.

(56) References Cited

U.S. PATENT DOCUMENTS

| | | | | |
|---|---|---|---|---|
| 2,835,515 A * | 5/1958 | Solari | ...................... | F16J 15/38 |
| | | | | 277/372 |
| 3,303,992 A * | 2/1967 | Johnson | ................ | F04D 29/563 |
| | | | | 415/149.4 |
| 4,834,613 A * | 5/1989 | Hansen | ................ | F04D 29/563 |
| | | | | 415/160 |
| 5,664,536 A * | 9/1997 | Bigsby | ...................... | F16J 9/24 |
| | | | | 123/193.4 |
| 6,457,721 B1 * | 10/2002 | Bloemers | ................... | F16J 9/24 |
| | | | | 277/445 |
| 6,550,779 B2 * | 4/2003 | Bjornson | ............. | F16J 15/3488 |
| | | | | 277/370 |
| 8,448,993 B2 * | 5/2013 | Cumic | ................. | F16L 21/065 |
| | | | | 285/112 |
| 8,951,010 B2 * | 2/2015 | Major | ................... | F01D 17/162 |
| | | | | 415/209.4 |
| 2003/0113204 A1 * | 6/2003 | Wolf | ..................... | F01D 17/162 |
| | | | | 415/165 |

FOREIGN PATENT DOCUMENTS

| | | | | |
|---|---|---|---|---|
| EP | 1760272 A2 * | 3/2007 | ............ | F01D 17/162 |
| FR | 2 824 593 A1 | 11/2002 | | |
| GB | 705150 A * | 3/1954 | ............. | F01D 9/065 |
| WO | WO 2015155442 A1 * | 10/2015 | ........... | F04D 29/102 |

* cited by examiner

DEVICE FOR GUIDING VARIABLE PITCH DIFFUSER VANES OF A TURBINE ENGINE

BACKGROUND OF THE INVENTION

The invention relates to the general field of turbine engine compressors, in particular for an airplane turboprop or turbojet. More precisely, the invention relates to a device enabling variable pitch diffuser vanes of a compressor stage to be guided.

The high pressure compressor of an aviation turbine engine has a plurality of diffuser stages with variable pitch vanes that alternate with stages of rotor blades. The diffuser vanes serve to modify the flow characteristics of the gas depending on the operating speeds of the turbine engine.

Each variable pitch diffuser vane has a control pivot at its head and a guide pivot at its foot, the control pivot passing through a stator jacket (known as the casing) of the turbine engine and co-operating with a control member for varying the pitch of the vanes, while the guide pivot is pivotally mounted in a bushing received in a socket in an inner ring of the turbine engine. By acting on the control member, it is thus possible to vary the pitch of the vanes in the stage in question.

The compressor casing is generally made as two half-shells in order to facilitate assembly. However, in order to reduce weight and increase the performance of the assembly, proposals have been made to make the casing as a single piece (extending over 360°). Unfortunately, when the compressor casing is a single piece in the tangential direction, it is found to be considerably more complicated to install the various portions of the compressor inside it. In particular, having recourse to a casing made of two half-shells enables the stator elements of the compressor to be assembled individually and then to be put in place around the elements of the rotor. With a single-piece casing, it is necessary to assemble in alternation a rotor stage and then a stator stage.

Furthermore, in order to dimension the rotor line of the compressor, its shroud line needs to be as close as possible to the flow passage for the stream of gas passing therethrough. This has the consequence of reducing the space available under the passage, and thus of making it necessary to reduce the radial size of the device for guiding the diffuser vanes.

Document FR 2 875 270 describes a diffuser vane guide device in which the inner ring under the vanes is made up of two half-rings clamped together by axial keys, a sealing member support being mounted on the inner ring. With such a device, the spacing between the vane guide pivots must be sufficient to enable the keys to be received therein without giving rise to cracks. Furthermore, that device presents relatively large radial size.

OBJECT AND SUMMARY OF THE INVENTION

A main object of the present invention is thus to propose a device for guiding variable pitch diffuser vanes that does not have such drawbacks.

In accordance with the invention, this object is achieved by a device for guiding variable pitch diffuser vanes of a turbine engine, the device comprising a first ring having an axial portion at its periphery that is extended by a collar extending radially outwards, a second ring mounted around the axial portion of the first ring so as to co-operate therewith to define a plurality of outwardly open sockets, a plurality of cylindrical bushings, each mounted in a respective socket for the purpose of receiving a guide pivot of a diffuser vane, and a resilient clamping ring for co-operating with one of the rings in order to clamp the two rings axially one against the other.

The first and second rings of the device of the invention form an inner ring that may be a single piece in the tangential direction (i.e. extending over 360°). Together, these two rings define a plurality of outwardly open sockets that receive the support bushings for the guide pivots of the diffuser vanes. These two rings are held one against the other by clamping. As a result, the device of the invention enables the diffuser vanes to be installed easily on an inner ring that may extend over 360°. In addition, having recourse to a clamping ring for holding the two rings together makes it possible to avoid any cracks forming and enables the radial size of the assembly to be reduced.

Preferably, the first ring has a plurality of angular cutouts in its axial portion in order to pass radial teeth carried by the clamping ring. The teeth of the clamping ring exert a force clamping the two rings one against the other.

The teeth of the clamping ring may extend radially outwards and the second ring may have a side face with a profile that slopes radially. Under such circumstances, the clamping ring is designed initially to be retracted in order to pass inside the first ring, and then to be released in order to enable the teeth to pass radially through the cutouts in the first ring and bear radially against the sloping side face of the second ring so as to exert an axial force clamping the two rings one against the other.

Alternatively, the teeth of the clamping ring may extend radially inwards, the cutouts in the first ring may each have a profile that slopes radially, and the second ring may have an inwardly open annular groove. Under such circumstances, the clamping ring is designed initially to be opened up to be received completely within the groove in the second ring, and then to be released in order to enable the teeth to pass radially through the cutouts in the first ring and block the second ring axially in position so as to exert an axial force clamping the two rings one against the other.

The clamping ring may be an open ring or a spiral ring. The first ring and the second ring may include indentations for receiving the bushings.

The invention also provides a turbine engine compressor having at least one device as defined above. The invention also provides a turbine engine including such a compressor.

BRIEF DESCRIPTION OF THE DRAWINGS

Other characteristics and advantages of the present invention appear from the following description made with reference to the accompanying drawings that show embodiments having no limiting character. In the figures.

DETAILED DESCRIPTION OF THE INVENTION

Figure 1:
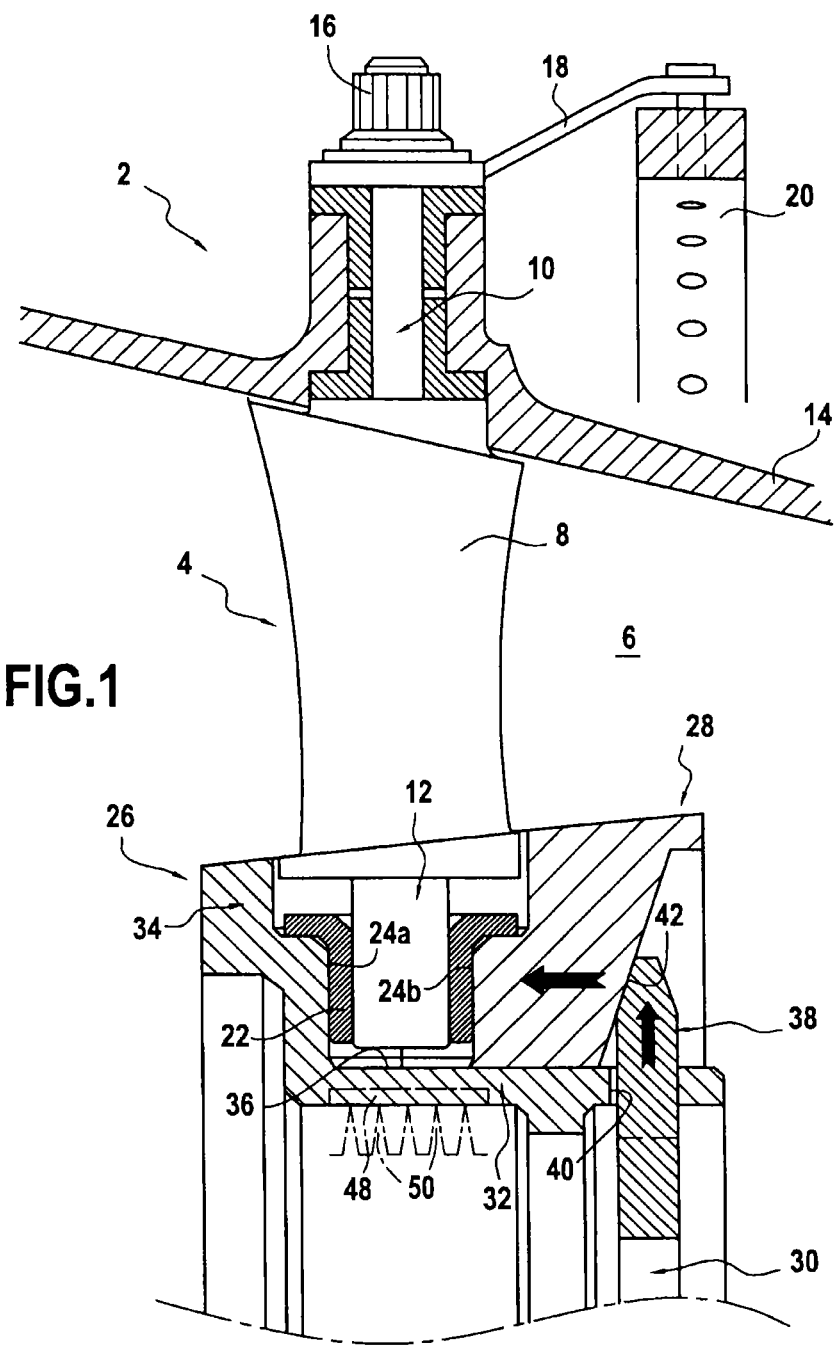
FIG. 1 is a diagrammatic view of a compressor diffuser stage having a vane guide device in an embodiment of the invention.

FIG. 1 is a diagram showing a diffuser stage 2 of an aviation turbine engine compressor, e.g. a high pressure compressor of an airplane turboprop or turbojet. Such a diffuser stage is located upstream from a stage of rotor blades (not shown) of the compressor.

The diffuser stage 2 has a plurality of stator vanes 4 of variable pitch angle that are arranged in the flow passage 6 for the stream of gas passing through the compressor.

Each variable pitch vane 4 is in the form of an airfoil 8 terminating at a radially outer end (or vane head) by a control pivot 10 (or top pivot) and at a radially inner end (or vane foot) by a guide pivot 12 (or bottom pivot).

The control pivot 10 of the vane 4 passes through a jacket 14 of the turbine engine casing and co-operates with a control member for varying the pitch of the vanes. For this purpose, the control pivot is typically terminated by a head 16 on which there is engaged one end of a control link 18 having its other end co-operating with a control ring 20.

The control links 18 and the control ring 20 form the member for controlling the pitch of the vanes 4. Turning the control ring about the longitudinal axis of the turbine engine serves to cause the control links to turn and thus to modify simultaneously the pitch of all of the variable pitch vanes in the high pressure compressor stage.

Each guide pivot 12 is for turning inside a hollow cylindrical bushing 22 forming a pivoting support. These bushings 22 are housed in indentations 24a, 24b formed in an inner ring of the turbine engine, the bushings and the indentations being substantially complementary in shape.

Figure 2:
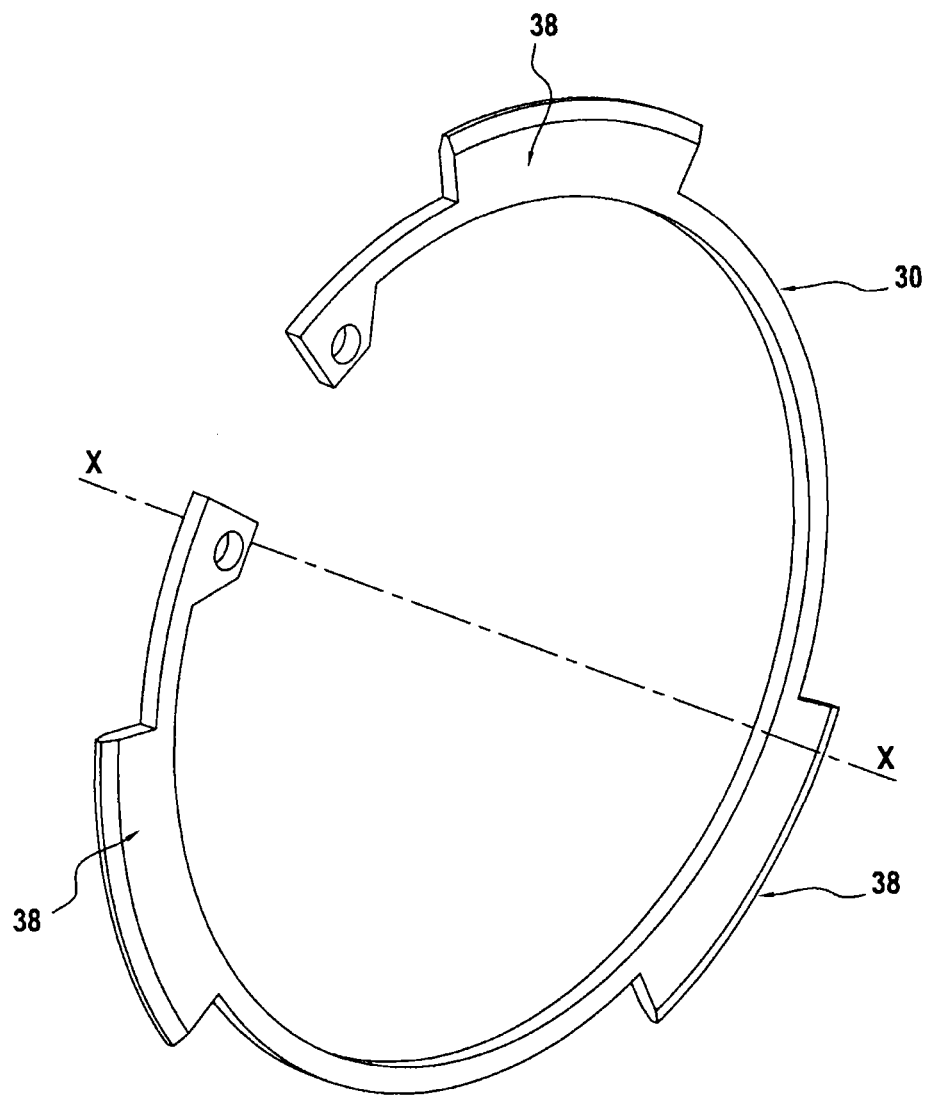
FIG. 2 is a perspective view of the clamping ring of the FIG. 1 device.
Figure 3:
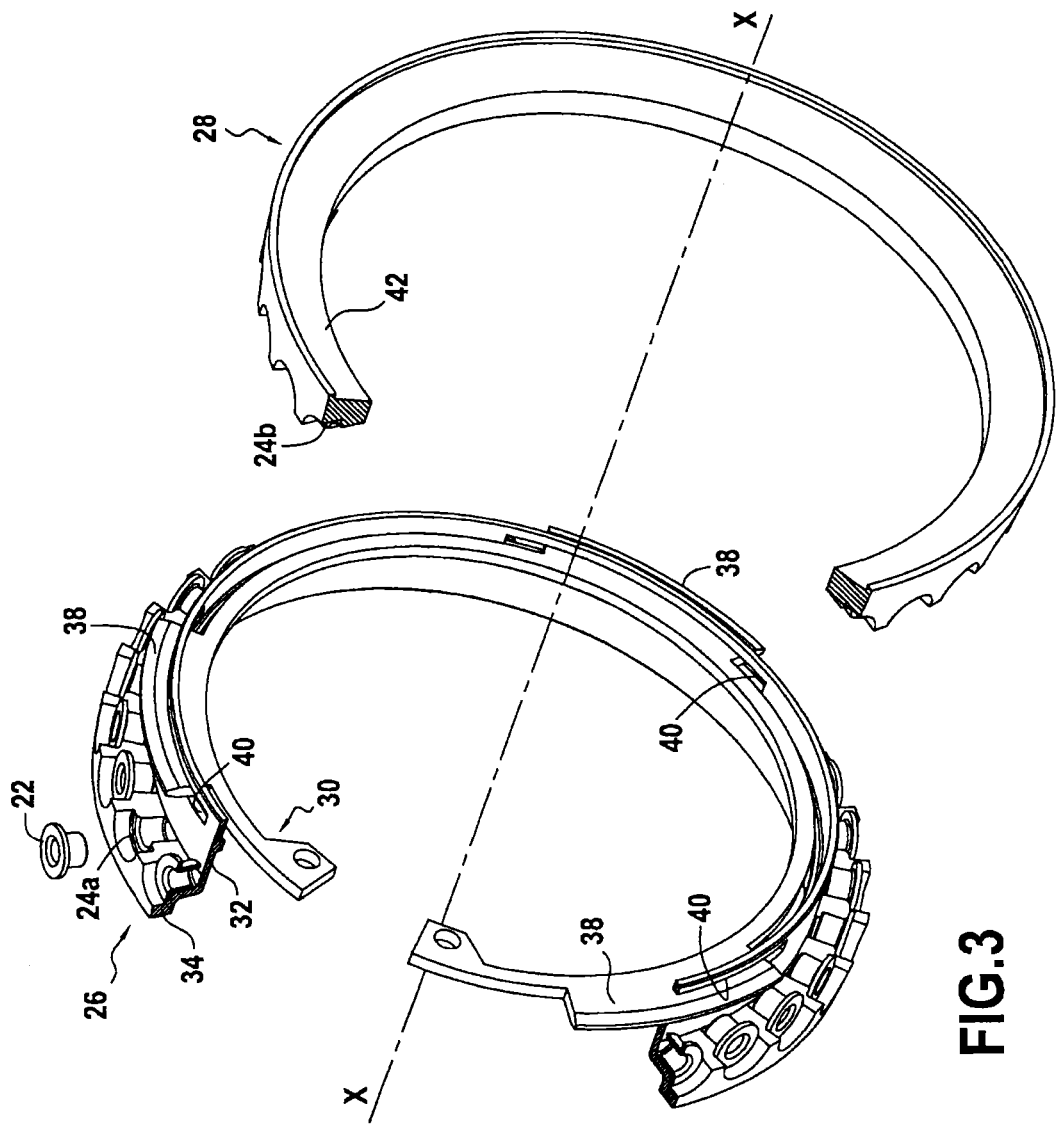
FIG. 3 is an exploded perspective view of the FIG. 1 device.

More precisely, and in accordance with the invention, the inner ring receiving the bushings 22 of the pivot for guiding the diffuser vanes comprise an upstream ring 26, a downstream ring 28, and a resilient clamping ring 30 (see also FIGS. 2 and 3).

The upstream ring 26 presents an axial portion 32 at its inner periphery that is extended upstream by a collar 34 extending radially outwards. The collar 34 has a plurality of indentations 24a of shape complementary to a portion of the bushings 22. This upstream ring 26 may be made as a single piece, i.e. it may form a single ring extending around 360°.

The downstream ring 28 is mounted around the axial portion 32 of the upstream ring 26 and it is axially spaced apart therefrom so as to co-operate therewith to form a plurality of cylindrical sockets 36 that are outwardly open and that are to receive the bushings 22. Like the upstream ring, this downstream ring 28 may be a single piece.

Furthermore, in an upstream side face, the downstream ring presents a plurality of indentations 24b of shape complementary to a portion of the bushings 22. Thus, the bushings 22 receiving the guide pivots of the diffuser vanes are positioned in the sockets 36 defined between the upstream and downstream rings and they are held circumferentially therein by the indentations 24a, 24b.

As shown in FIG. 2, the clamping ring 30 is a resilient ring that is open or split. This clamping ring 30 has teeth 38 that are regularly spaced apart around an axis of revolution X-X of said clamping ring, the teeth extending radially outwards.

Furthermore, these teeth 38 of the clamping ring are for passing radially through angular cutouts 40 formed in the axial portion 32 of the upstream ring 26 so as to clamp the two rings 26 and 28 axially one against the other as can be understood from the process for assembling the diffuser stage, as described below.

Initially, the bushings 22 are positioned on the guide pivot 12 of the vanes 4. The upstream ring 26 is mounted so as to put the indentations 24a made in its downstream side face into correspondence with the bushings 22. Then the downstream ring 28 is docked axially from downstream going upstream so as to put the indentations 24b formed in its upstream side face into correspondence with the bushings 22.

The clamping ring 30 is then put into position via the inside of the upstream ring. For this purpose, and since it is made of resilient material, the clamping ring is retracted (e.g. by means of an appropriate tool) in order to reduce its diameter so as to enable it to pass into the upstream ring. The teeth 38 carried on the clamping ring are angularly positioned in register with the cutouts 40 made in the upstream ring.

The clamping ring is then released, thereby enabling it to return to its initial diameter. Its teeth 38 then pass radially (from the inside towards the outside) through the cutouts 40 in the upstream ring 26 so as to come into radial abutment against the downstream side face of the downstream ring 28.

This downstream side face of the downstream ring presents a profile 42 that slopes radially (i.e. a profile that lies on a plane that slopes downstream). The teeth 38 of the clamping ring are chamfered with the same radial slope such that the clamping ring can be used either way round (upstream or downstream). Thus, as represented by the arrows in FIG. 1, when the teeth of the clamping ring come radially into contact against the downstream side face of the downstream ring, they apply an axial force from downstream to upstream against the downstream ring, thereby causing the upstream and downstream rings to be clamped axially one against the other.

Figure 4:
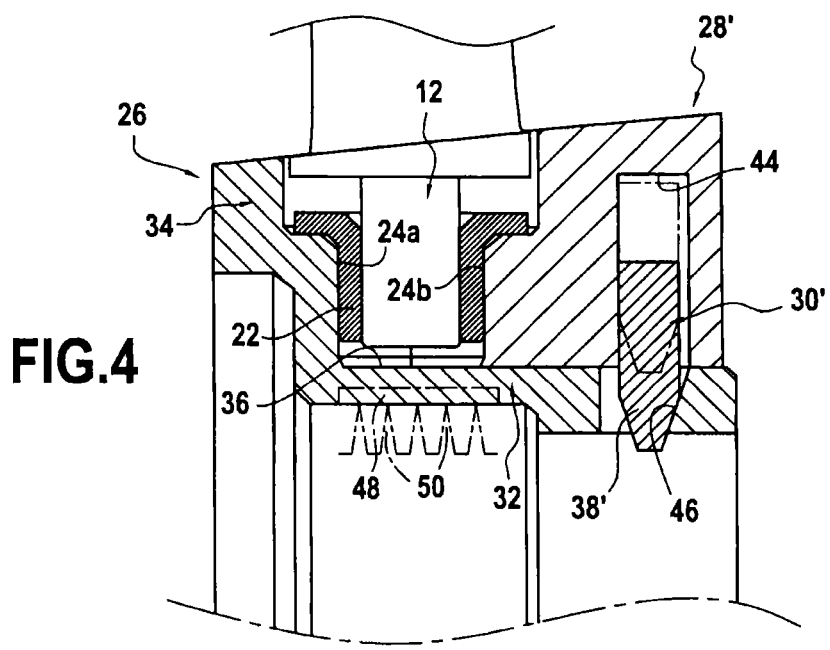
FIG. 4 is a diagrammatic view of a guide device in another embodiment of the invention.
Figure 5:
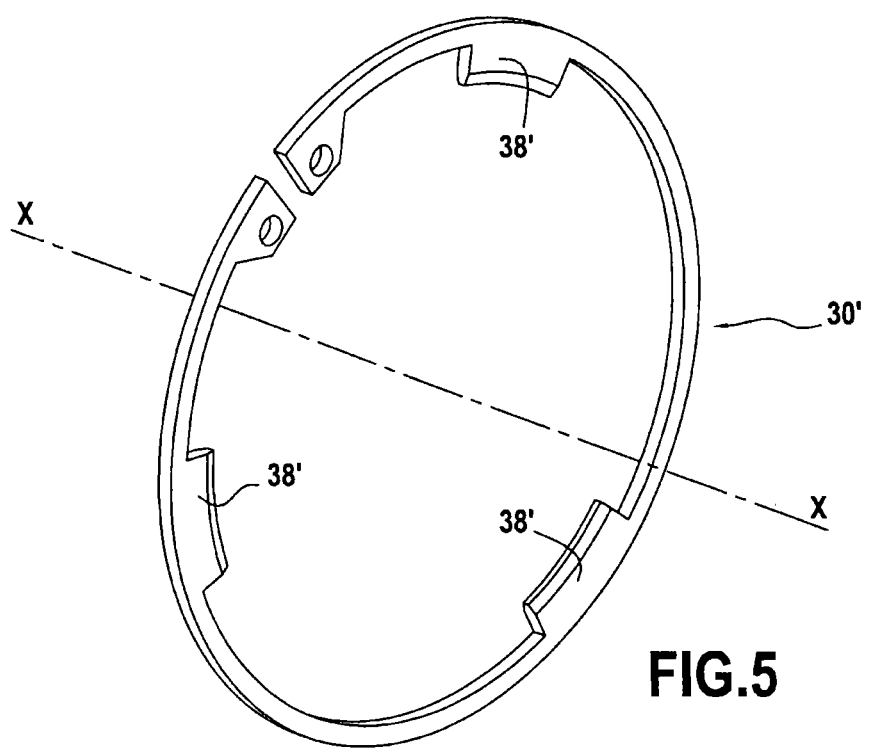
FIG. 5 is a perspective view of the clamping ring of the FIG. 4 device.

FIGS. 4 and 5 show a guide device in another embodiment of the invention.

This embodiment differs from the above-described embodiment in particular in terms of the downstream ring 28' and of the resilient clamping ring 30'. In particular, the downstream ring 28' has an annular groove 44 that is open towards the inside and that is dimensioned so as to be capable of receiving the clamping ring 30' in full.

As shown in FIG. 5, the clamping ring 30' has teeth 38' that are regularly distributed around its axis of revolution X-X and that extend radially inwards. As in the above-described embodiment, these teeth 38' are for passing radially through angular cutouts 40 formed in the axial portion 32 of the upstream ring 26 (but in this example from the outside towards the inside) so as to provide axial clamping of the upstream and downstream rings 26 and 28' one against the other.

In this example, the assembly process is as follows. Initially, the bushings 22 are positioned on the guide pivots 12 of the vanes. The downstream ring 28' is axially docked from downstream to upstream so as to put its indentations 24b into correspondence with the bushings 22. The clamping ring 30' is then opened up (e.g. using an appropriate tool) in order to increase its diameter and it is positioned entirely (including its teeth 38') in the groove 44 formed in the downstream ring 28', as shown in chain-dotted lines in FIG. 4.

The clamping ring 30' is held in this state and in this position in order to enable the upstream ring 26 to dock axially (from upstream to downstream) so as to put its indentations 24a into correspondence with the bushings 22.

The teeth 38' of the clamping ring are angularly positioned so as to face the cutouts 40 formed in the upstream ring.

The clamping ring is then released, thereby enabling it to return to its initial diameter. Its teeth 38' then pass radially (from outside towards the inside) through the cutouts 40 in the upstream ring 26 so as to come radially into abutment against downstream side faces of the cutouts 40 in the upstream ring.

A downstream side face of a cutout 40 presents a profile 46 with a radial slope (i.e. it lies in a plane sloping downstream). The teeth 38' of the clamping ring are chamfered with the same radial slope, such that the clamping ring can be used either way round (upstream or downstream). Thus, when the teeth of the clamping ring come radially into contact against the downstream side faces of the cutouts 40, they enable the clamping ring to apply an axial force from upstream to downstream on the upstream ring 26, thereby axially clamping the upstream and downstream rings one against the other.

Various features that are common to both of the above-described embodiments are described below.

Figure 6:
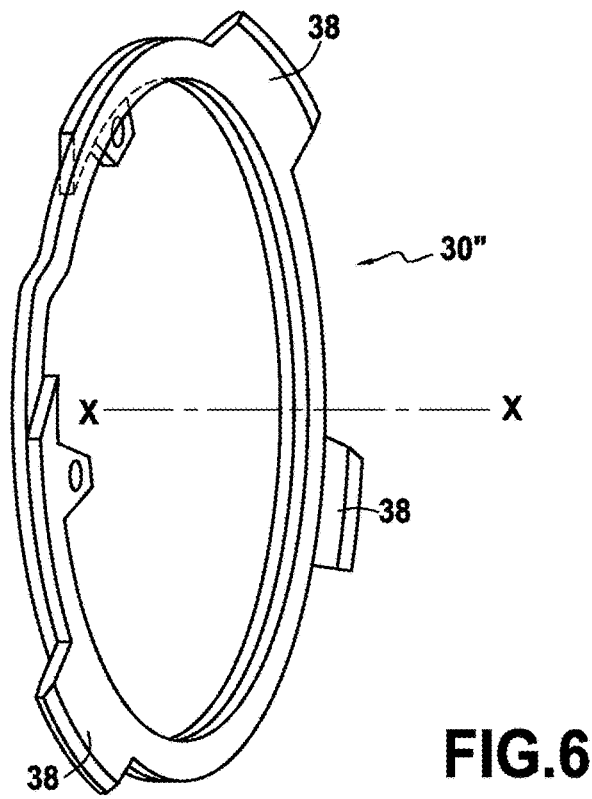
FIG. 6 is a perspective view of the clamping ring in another embodiment of the invention.
Figure 7:
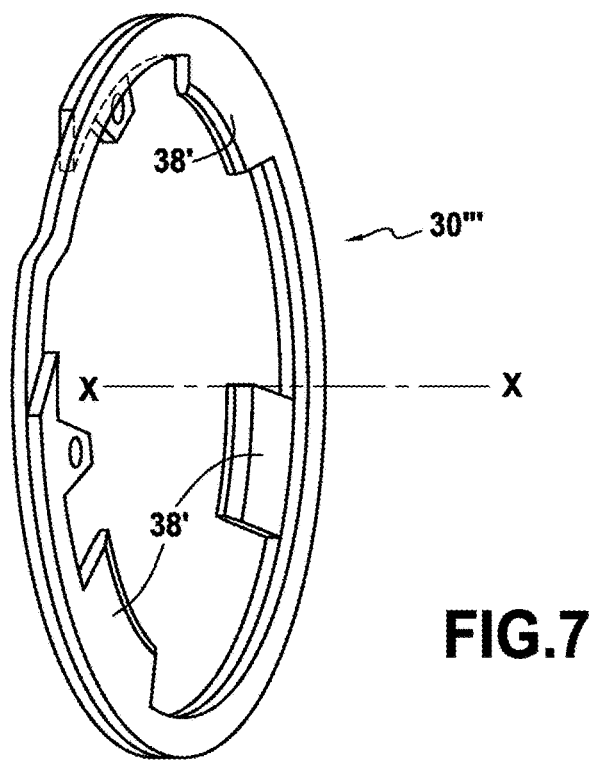
FIG. 7 is a perspective view of the clamping ring in another embodiment of the invention.

The resilient clamping ring 30, 30', 30", or 30''' may be made in various ways. As shown in FIGS. 2 and 5, it may be open or split. Alternatively, as shown in FIGS. 6 and 7, it may be a spiral ring having overlapping angular zones. Likewise, its shape with teeth 38, 38' could vary more gradually than that shown in the figures.

The guide device of the invention is symmetrical for the upstream ring and the downstream ring, i.e. they could be interchanged.

As shown in FIG. 1, the guide device of the invention enables sealing to be put into place. For this purpose, the axial portion 32 of the upstream ring 26 may carry a support 48 for an abradable coating for the purpose of co-operating with wipers 50 carried by a rotor of the compressor.

There is no need to provide any blocking of the teeth 38, 38' of the clamping ring 30, 30' for the purpose of preventing them from escaping from the cutouts 40 formed in the upstream ring 26. In the event of surging, it is the entire device (upstream ring, downstream ring, and clamping ring) that moves in translation.

The invention claimed is:

1. A device for guiding variable pitch diffuser vanes of a turbine engine, the device comprising:
   a first ring having an axial portion at a periphery of the first ring that is extended by a collar extending radially outwards;
   a second ring mounted around the axial portion of the first ring so as to cooperate therewith to define a plurality of outwardly open sockets;
   a plurality of cylindrical bushings, each mounted in a respective socket for the purpose of receiving a guide pivot of a diffuser vane; and
   a resilient clamping ring carrying radial teeth, for cooperating with at least one of the first and second rings in order to clamp the first and second rings axially one against the other,
   wherein the first ring or the second ring has a face with a profile that slopes radially, and the resilient clamping ring cooperates with said face,
   wherein the first ring has a plurality of angular cutouts in the axial portion of the first ring in order to accommodate the radial teeth carried by the clamping ring, and
   wherein the teeth of the clamping ring extend radially outwards and the second ring has a side face with a profile that slopes radially.

2. A device according to claim 1, wherein the clamping ring is designed initially to be retracted in order to pass inside the first ring, and then to be released in order to enable the teeth to pass radially through the cutouts in the first ring and bear radially against the sloping side face of the second ring so as to exert an axial force clamping the two rings one against the other.

3. A device for guiding variable pitch diffuser vanes of a turbine engine, the device comprising:
   a first ring having an axial portion at a periphery of the first ring that is extended by a collar extending radially outwards;
   a second ring mounted around the axial portion of the first ring so as to cooperate therewith to define a plurality of outwardly open sockets;
   a plurality of cylindrical bushings, each mounted in a respective socket for the purpose of receiving a guide pivot of a diffuser vane; and
   a resilient clamping ring carrying radial teeth, for cooperating with at least one of the first and second rings in order to clamp the first and second rings axially one against the other,
   wherein the first ring or the second ring has a face with a profile that slopes radially, and the resilient clamping ring cooperates with said face,
   wherein the first ring has a plurality of angular cutouts in the axial portion of the first ring in order to accommodate the radial teeth carried by the clamping ring, and
   wherein the teeth of the clamping ring extend radially inwards, the cutouts in the first ring each having a profile that slopes radially, and the second ring has an inwardly open annular groove.

4. A device according to claim 3, wherein the clamping ring is designed initially to be opened up to be received completely within the groove in the second ring, and then to be released in order to enable the teeth to pass radially through the cutouts in the first ring and block the second ring axially in position so as to exert an axial force clamping the two rings one against the other.

5. A device according to claim 1, wherein the clamping ring is an open ring or a spiral ring.

6. A device according to claim 1, wherein the first ring and the second ring include indentations for receiving the bushings.

7. A device according to claim 3, wherein the clamping ring is an open ring or a spiral ring.

8. A device according to claim 3, wherein the first ring and the second ring include indentations for receiving the bushings.

\* \* \* \* \*